(12) United States Patent
Tapper

(10) Patent No.: US 7,358,637 B2
(45) Date of Patent: Apr. 15, 2008

(54) METHOD OF COMPRESSING LAMINATION STACKS FOR PERMANENT MAGNET ROTOR

(75) Inventor: Kevin Lee Tapper, Greensburg, PA (US)

(73) Assignee: Canopy Technologies, LLC, Jeannette, PA (US)

( * ) Notice: Subject to any disclaimer, the term of this patent is extended or adjusted under 35 U.S.C. 154(b) by 205 days.

(21) Appl. No.: 11/267,110

(22) Filed: Nov. 4, 2005

(65) Prior Publication Data

US 2007/0103023 A1    May 10, 2007

(51) Int. Cl.
*H02K 1/27* (2006.01)
*H02K 1/28* (2006.01)

(52) U.S. Cl. ............... 310/156.08; 310/156.22; 310/217; 310/261

(58) Field of Classification Search ........ 310/216–217, 310/261, 156.19, 156.22, 156.08, 156.09
See application file for complete search history.

(56) References Cited

U.S. PATENT DOCUMENTS

| | | | |
|---|---|---|---|
| 464,026 A * | 12/1891 | Kammeyer | .............. 310/264 |
| 891,273 A * | 6/1908 | Lord | ...................... 310/216 |
| 1,948,829 A | 2/1934 | Reis | |
| 3,979,821 A * | 9/1976 | Noodleman | ............... 29/598 |
| 4,085,347 A | 4/1978 | Lichius | |
| 4,358,697 A | 11/1982 | Liu et al. | |
| 4,433,261 A * | 2/1984 | Nashiki et al. | ........ 310/156.28 |
| 4,542,313 A | 9/1985 | Di Pietro | |
| 4,585,967 A | 4/1986 | Mayer et al. | |
| 4,631,807 A * | 12/1986 | Kawada et al. | ............... 29/598 |
| 4,644,210 A * | 2/1987 | Meisner et al. | ............ 310/211 |
| 4,674,178 A * | 6/1987 | Patel | ........................ 29/598 |
| 4,728,842 A | 3/1988 | Martin | |
| 4,742,259 A * | 5/1988 | Schaefer et al. | ....... 310/156.28 |
| 4,845,837 A | 7/1989 | Lloyd | |
| 5,091,668 A | 2/1992 | Cuenot et al. | |
| 5,554,900 A | 9/1996 | Pop, Sr. | |
| 5,771,566 A | 6/1998 | Pop, Sr. | |
| 6,259,180 B1 | 7/2001 | Pop, Sr. | |
| 6,346,760 B1 | 2/2002 | Boardman, IV | |
| 6,426,576 B1 * | 7/2002 | Varenne | ................. 310/156.09 |
| 6,534,891 B2 | 3/2003 | Kliman et al. | |
| 6,601,287 B2 | 8/2003 | Pop, Sr. | |
| 6,614,142 B1 | 9/2003 | Bonnieman et al. | |

(Continued)

FOREIGN PATENT DOCUMENTS

EP    0 431 514 A1    6/1991

*Primary Examiner*—Burton Mullins
(74) *Attorney, Agent, or Firm*—The Webb Law Firm

(57) ABSTRACT

The present invention is a method of compressing lamination stacks for a permanent magnet rotor. The method includes the steps of providing a plurality of stages of lamination stacks and magnet carriers on a rotor shaft to form an assembly; positioning a spacer between each of the lamination stacks of each of the plurality of stages; and fitting a retainer plate with a groove at each end of the assembly. The groove allows a centrifugal force to deflect a top of the retainer plate inward toward the spacers and the spacers are milled to a size that is slightly wider than an axial gap between the lamination stacks of each stage. The groove on the retainer plates has a depth and radial position that determines the extent to which the top of the retainer plate deflects towards the spacers.

16 Claims, 5 Drawing Sheets

U.S. PATENT DOCUMENTS

| | | |
|---|---|---|
| 6,703,741 B1 | 3/2004 | Ifrim |
| 6,741,010 B2 | 5/2004 | Wilkin |
| 6,765,329 B2 | 7/2004 | Wolters |
| 6,772,503 B1 | 8/2004 | Fathimulla et al. |
| 6,933,645 B1 | 8/2005 | Watson |
| 7,205,695 B2 * | 4/2007 | Smith .................. 310/218 |
| 2004/0107562 A1 | 6/2004 | Wolters |
| 2004/0124736 A1 | 7/2004 | Gauthier et al. |
| 2004/0245884 A1 | 12/2004 | Smith |
| 2005/0034295 A1 | 2/2005 | Meacham et al. |
| 2005/0040727 A1 | 2/2005 | Edwards et al. |

\* cited by examiner

METHOD OF COMPRESSING LAMINATION STACKS FOR PERMANENT MAGNET ROTOR

BACKGROUND OF THE INVENTION

1. Field of the Invention

The present invention relates to a rotary electric device and, more particularly, to a permanent magnet rotor in a permanent magnet type rotary electric device.

2. Description of Related Art

Machines powered by electric motors often use permanent magnet rotor assemblies. A typical rotor assembly of this type has a plurality of permanent magnets spaced around the periphery of a rotor core and includes lamination stacks mechanically secured to resist centrifugal forces when the shaft rotates.

One of the challenges in designing high-speed permanent magnet motors is retention of the lamination stacks in a position that does not permit movement of an individual lamina relative to one another and keeps the lamination stacks in a compressed state. Failure to hold the laminations securely results in fretting or cyclic bending of individual lamina leading to eventual fatigue.

Currently, several methods are used in permanent magnet motors and alternators to secure and compress lamination stacks. One of these methods includes bonding a stack of laminations together using a dielectric bonding agent. See, for example, Fathimulla et al. U.S. Pat. No. 6,772,503 entitled "Rotor Assembly Having Bonded Lamination Stack". However, the use of such bonding agents limits the speed and power of permanent magnet motors or alternators due to the limited strength of the bonding agents or adhesives. An alternate method for compressing a lamination stack is to clamp the lamination stack with a central tie shaft. See, for example, Wilkin, U.S. Pat. No. 6,741,010 entitled "Rotor Disc Assembly Having Rotor Rim and Alternate Magnets and Laminated Pole Pieces" and Ifrim, U.S. Pat. No. 6,703,741 entitled "Permanent Magnet Rotor Portion for Electric Machine". In such a system, a higher clamping load results in higher lamination stiffness. However, high clamping loads also decreases the efficiency of the permanent magnet rotor.

An improved arrangement for securing the laminations and permanent magnets is disclosed in Watson, U.S. Pat. No. 6,933,645 entitled "Permanent Magnet Rotor and Magnet Cradle" which is assigned to the same assignee as this application.

A need exits for a method of compressing and securing lamination stacks in a permanent magnet rotor such that movement between individual lamina is reduced.

SUMMARY OF THE INVENTION

The present invention is a method of compressing lamination stacks for a permanent magnet rotor. The method includes the steps of providing a plurality of stages of lamination stacks and magnet carriers on a rotor shaft to form an assembly; positioning a spacer between each of the lamination stacks of each of the plurality of stages; and fitting a disc-shaped retainer plate with a circular groove at each end of the assembly. The groove faces away from the lamination stacks and is positioned radially inward of the outer radial edge of the retainer plate. The groove allows a centrifugal force to deflect an outer radial edge of the retainer plate inward toward the spacers and the spacers are milled to a size that is slightly wider than an axial gap between the lamination stacks of each stage. The groove on the retainer plates has a depth and radial position that determines the extent to which the top of the retainer plates deflect towards the lamination stacks.

The lamination stacks are generally C-shaped and may be constructed from a high magnetic permeability material, such as electrical steel. The retainer plates may be constructed of a high strength, lightweight, non-magnetic material, such as titanium.

The present invention is further directed to a permanent magnet rotor. The permanent magnet rotor includes a non-magnetic cylindrical shaft having an axis of rotation and a generally cylindrical surface with an even number of recessed slots defining an even number of ribs therebetween; a plurality of stages of lamination stacks and magnets and, preferably, magnet carriers surrounding the shaft to form an assembly, each stage comprising: a plurality lamination stacks surrounding the ribs, and a plurality of permanent magnets or a plurality of non-magnetic carriers positioned in the recessed slots for supporting a plurality permanent magnets; a plurality of oversized spacers positioned between the lamination stacks of each of the stages; and a disc-shaped retainer plate with a circular groove at each end of the assembly facing away from the lamination stacks, wherein the groove allows a centrifugal force to deflect a outer radial edge of the retainer plates inward toward the lamination stacks.

Further details and advantages of the present invention will become apparent upon reading the following detailed description in conjunction with the accompanying drawings.

DETAILED DESCRIPTION OF THE PRESENT INVENTION

The present invention will be described with reference to the accompanying drawings where like reference numbers correspond to like elements.

Figure 1:
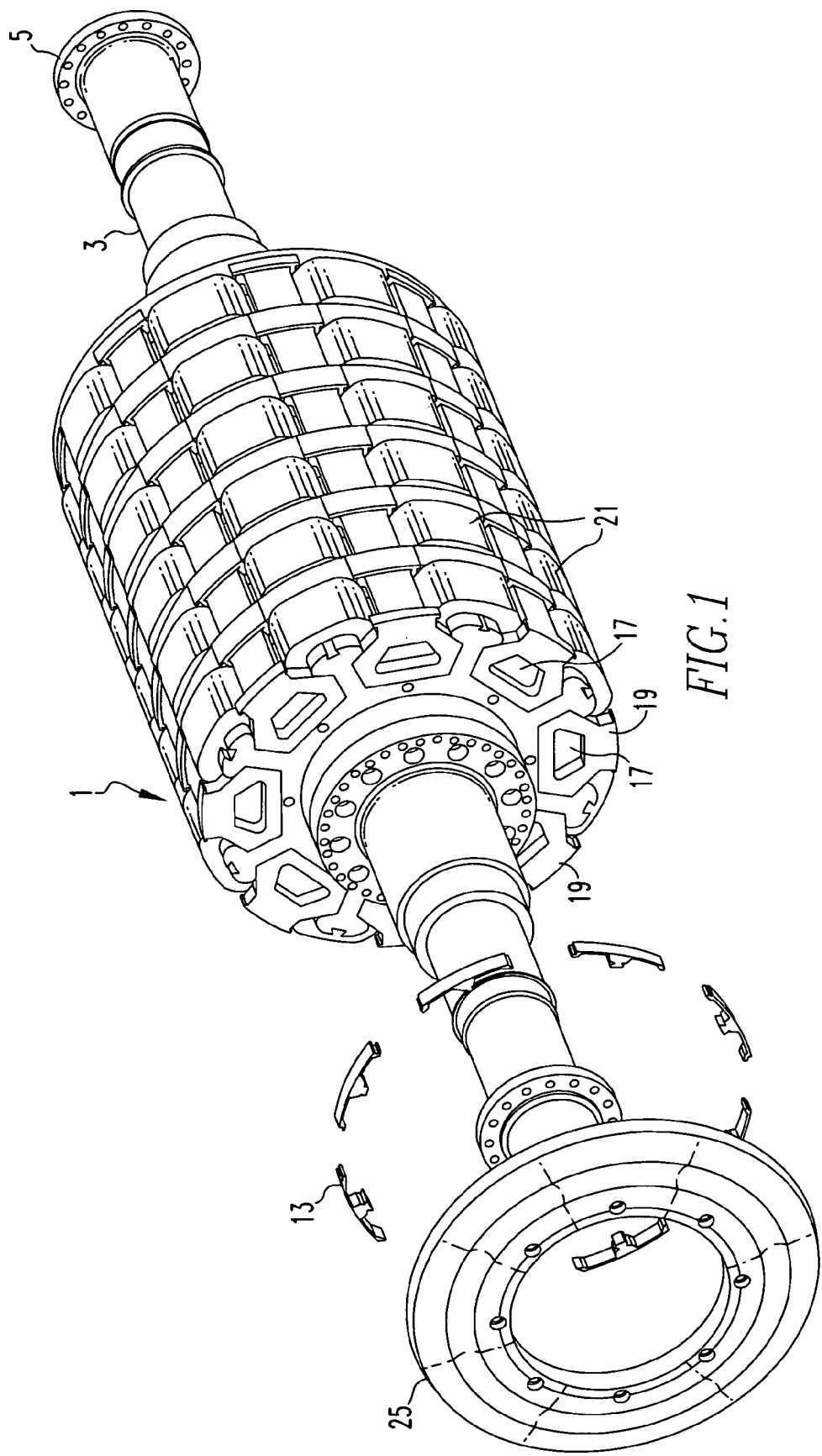
FIG. 1 is a partially exploded, perspective view of a permanent magnet rotor in accordance with the present invention.
Figure 2:
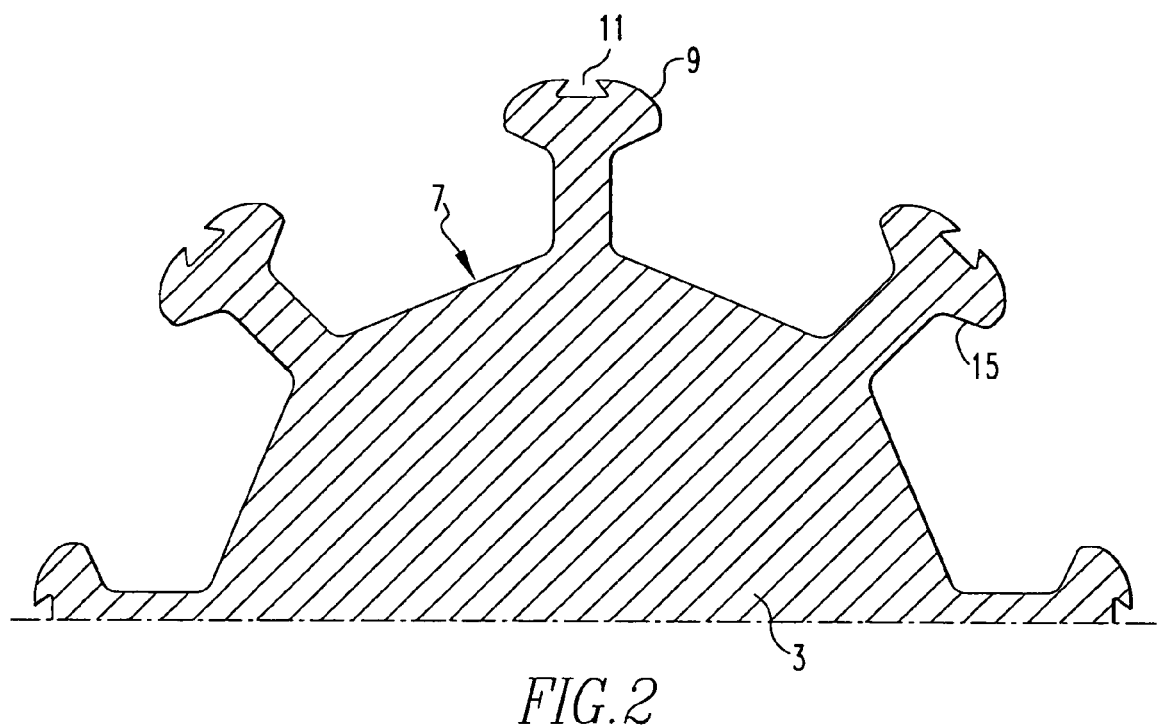
FIG. 2 is a section view of the rotor taken perpendicular to the rotor axis.

With reference to FIGS. 1 and 2, a shaft 3 comprises the foundation of a permanent magnet rotor 1 according to this invention. Shaft 3 is made of a non-magnetic high strength material, such a nickel cobalt alloy. Shaft 3 has an interrupted cylindrical surface defined relative to the rotational axis of permanent magnet rotor 1. At each end of the shaft, provisions are made for bearings 5. Bearings 5 establish the rotational axis of permanent magnet rotor 1. Shaft 3 has an even number of substantially identical recessed and overhung slots 7. Slots 7 define substantially identical generally T-shaped ribs 9 with notches 11 for securing an oversized spacer 13 and dovetail surfaces 15 adjacent the slots.

Figure 3:
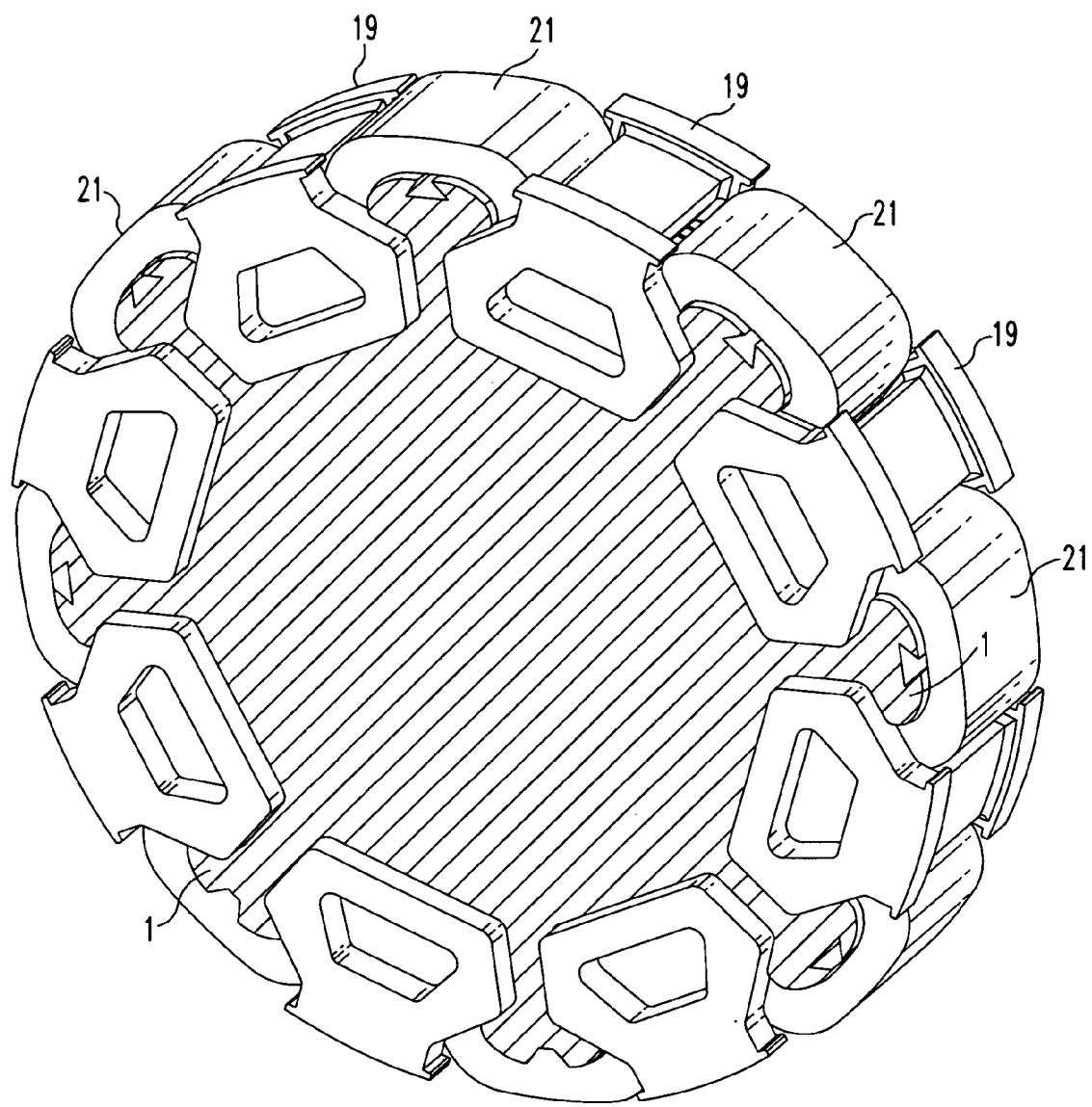
FIG. 3 is an assembled perspective view of a stage of carriers and lamination stacks surrounding the rotor shaft.

With reference to FIG. 3, and with continuing reference to FIGS. 1 and 2, the rotor design of the present invention includes a plurality of stages of magnet stacks 17 held in carriers 19 with lamination stacks 21 positioned between the end walls of each carrier 19. An example of a single stage is illustrated in FIG. 3. Lamination stacks 21 are generally C-shaped and are comprised of a high-magnetic permeability material, such as electrical steel. Each lamination stack 21 surrounds T-shaped ribs 9. Lamination stacks 21 are made up of individual sheets positioned perpendicular to the axis of rotation of shaft 3. The non-magnetic carriers 19 for holding permanent magnet stacks 17 are positioned in each slot 7. Each carrier 19 carries laminated permanent magnet stacks 17. Carriers 19 are formed of lightweight non-magnetic structural material, such as titanium. The axial end walls of carrier 19 have edges that are configured to abut dovetail surface 15 of T-shaped ribs 9. The space between the axial end walls of carriers 19 is large enough to span the axial length of magnet stacks 17 and also the axial length of lamination stacks 21. Desirably, the axial length of magnet stacks 17 and laminated stacks 21 is identical.

The magnets comprising magnet stacks 17 are typically rare earth permanent magnets. The magnets are magnetized with opposite poles at each circumferential edge face. The poles abutting any C-shaped lamination stack 21 are of the same polarity. The portion of lamination stack 21 directly over each T-shaped rib 9 is a magnetic pole of permanent magnet rotor 1.

Figure 4:
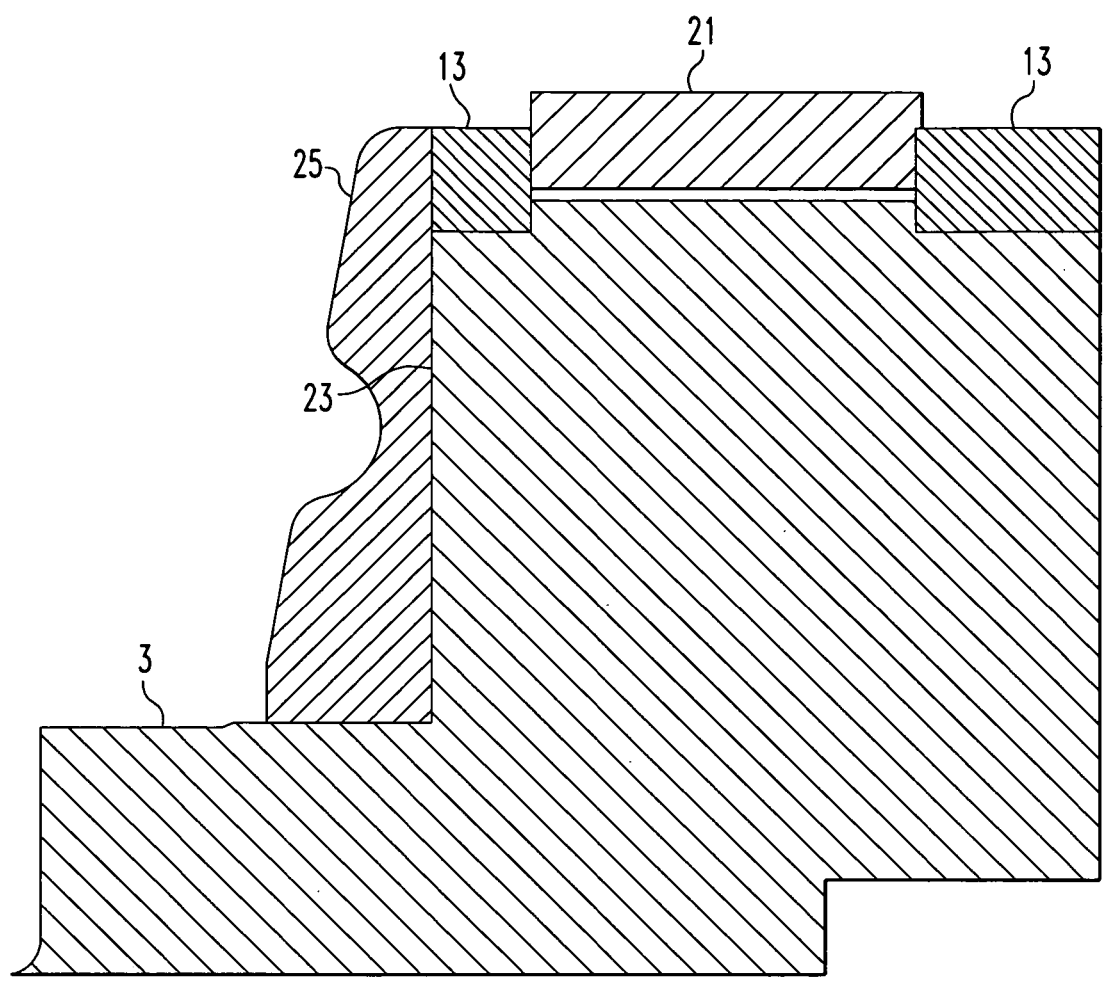
FIG. 4 is a partial cross-sectional view of an assembly of lamination stacks, spacers, and an end retainer plate in accordance with the present invention.

With reference to FIG. 4, and with continuing reference to FIGS. 1 through 3, in order to add more power to the motor, additional stages of carriers 18 and lamination stacks 21 are added. The addition of these stages creates gaps between lamination stacks 21 in each axial row due to the position of the lamination stack 21 between the end walls of two carriers 19. In order to securely compress the lamination stacks 21 a spacer 13 is provided between lamination stacks 21. Spacers 13 are milled to a size that is slightly wider than the axial gap created between lamination stacks 21 of separate stages. Spacers 13 are positioned between each lamination stack 21 and secured by notches 11 in T-shaped rib 9. Therefore, when several stages of carriers 18 and lamination stacks 21 are assembled with spacers 13 positioned between each of the lamination stacks of separate stages, lamination stacks 21 are caused to act as one long axial stack for means of compressing. The first and last stages of carriers 18 and lamination stacks 21 include spacers 13 that are ground so that they overhang past the carrier end walls. This creates a small gap 23 when an end retainer plate 25 is applied to each end of the assembly and drawn tight by bolting.

Figure 5:
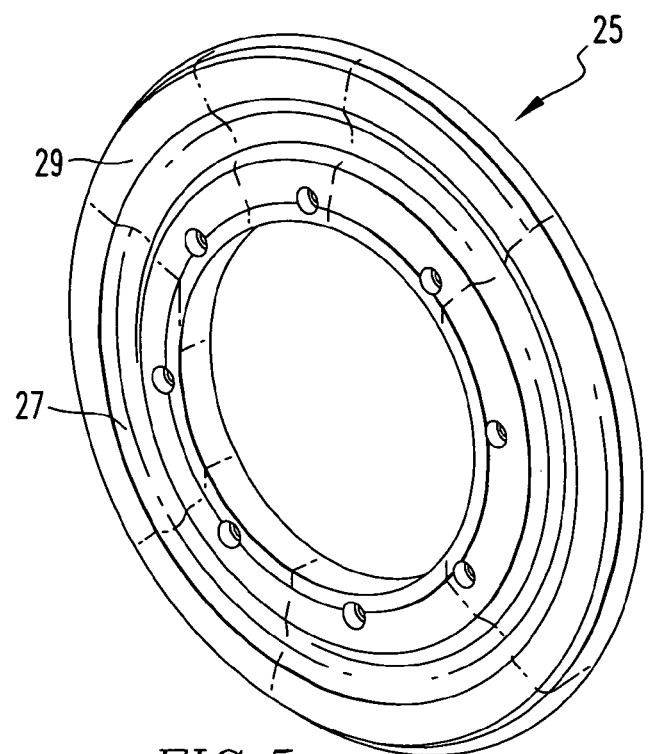
FIG. 5 is a perspective view of an end retainer plate in accordance with the present invention.
Figure 6:
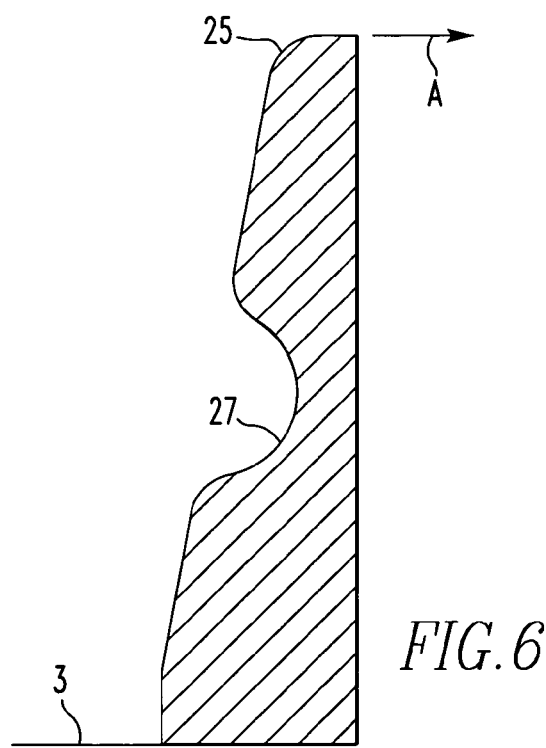
FIG. 6 is a partial cross-sectional view of the end retainer plate of FIG. 5.

With reference to FIGS. 5 and 6, end retainer plates 25 are designed to include a groove 27 on a front side 29. Groove 27 allows the centrifugal force to deflect the top of retainer plate 25 inward towards spacers 13 in the direction designated by arrow A. This deflection keeps lamination stacks 21 in compression. The depth and radial position of groove 27 determines how far the top of the retainer plate 25 deflects inward toward spacers 13. Without groove 27, retainer plates 25 would deflect away from spacers 13 and, therefore, not provide any compressive forces to lamination stacks 21. End retainer plates 25 may be constructed from a high-strength, lightweight, non-magnetic material such as titanium.

The present invention provides a method of compressing and securing lamination stacks in a permanent magnet rotor such that movement between individual lamina is reduced. The reduction of such movement prevents individual lamina from fretting or cyclic bending which eventually leads to fatigue failure. Furthermore, the present invention includes compressing an assembly of lamination stacks and magnet carriers between end retainer plates with a grooved front side. The groove on the front side of the end retainer plates deflects the centrifugal force inward toward the spacers thus keeping the lamination stacks in a compressed state.

While the present invention was described with reference to preferred embodiments of the method of compressing lamination stacks for a permanent magnet rotor, those skilled in the art of may make modifications and alterations to the present invention without departing from the scope and spirit of the invention. Accordingly, the above detailed description is intended to be illustrative rather than restrictive. The invention is defined by the appended claims, and all changes to the invention that fall within the meaning and range of equivalency of the claims are to be embraced by their scope.

The invention claimed is:

1. A method of compressing lamination stacks for a permanent magnet rotor, comprising the steps of:
   a) providing a plurality of stages of lamination stacks and magnets on a rotor shaft to form an assembly;
   b) positioning a spacer between each of the lamination stacks of each of the plurality of stages such that the spacers and lamination stacks abut each other; and
   c) fitting a disc-shaped retainer plate at each end of the assembly for axially restraining the lamination stacks and spacers, each retainer plate having a circular groove facing away from the lamination stacks and being radially inward of the outer radial edge of the disc-shaped retainer plates, wherein the grooves allow centrifugal force to deflect the outer radial edges of the retainer plates inward toward the lamination stacks,
   wherein the spacers are milled to a size that is slightly wider than an axial gap between the lamination stacks of each stage.

2. The method of claim 1, wherein the lamination stacks are generally C-shaped.

3. The method of claim 1, wherein the lamination stacks are constructed from a material with high magnetic permeability.

4. The method of claim 3, wherein the lamination stacks are constructed from electrical steel.

5. The method of claim 1, wherein the groove on the retainer plates has a depth and radial position.

6. The method of claim 5, wherein the depth and radial position of the groove determines an extent to which the top of the retainer plate deflects.

7. The method of claim 1, wherein the retainer plates are constructed of a high strength, lightweight, non-magnetic material.

8. The method of claim 7, wherein the retainer plates are constructed from titanium.

9. A permanent magnet rotor assembly comprising:
   a non-magnetic cylindrical shaft having an axis of rotation and a generally cylindrical surface with an even number of recessed slots defining an even number of ribs therebetween;
   a plurality of stages of lamination stacks and magnets surrounding the shaft to form an assembly, each stage comprising:
      a plurality lamination stacks surrounding the ribs, and
      a plurality of permanent magnets circumferentially positioned between the lamination stacks;
   a plurality of oversized spacers positioned between the lamination stacks of each of the stages; and disc-shaped retainer plates at each axial end of the rotor for axially restraining the lamination stacks, each retainer plate having a circular groove facing away from the lamination stacks and being inward of the outer radial edge, wherein the grooves allow centrifugal force to deflect the outer radial edges of the retainer plates toward the lamination stacks, wherein the spacers are milled to a size that is slightly wider than an axial gap between the lamination stacks of each stage.

10. The rotor of claim 9, wherein the lamination stacks are generally C-shaped.

11. The rotor of claim 9, wherein the lamination stacks are constructed from a material with high magnetic permeability.

12. The rotor of claim 11, wherein the lamination stacks are constructed from electrical steel.

13. The rotor of claim 9, wherein the groove on the retainer plates has a depth and radial position.

14. The rotor of claim 13, wherein the depth and radial position of the groove determines an extent to which the top of the retainer plate deflects.

15. The rotor of claim 9, wherein the retainer plates are constructed of a high strength, lightweight, non-magnetic material.

16. The rotor of claim 15, wherein the retainer plates are constructed from titanium.

* * * * *